United States Patent Office 2,909,550
Patented Oct. 20, 1959

2,909,550
METHODS OF PREPARING ESTERS OF ORTHOSILICIC ACID

Fritz Sperr, Trostberg an der Alz, and Egon Wiberg, Munich, Germany, assignors to Union Carbide Corporation, a corporation of New York No Drawing. Application June 2, 1955
Serial No. 512,866

13 Claims. (Cl. 260—448.8)

This invention relates to esters of orthosilicic acid, and to methods of preparing the same.

Such compounds are of industrial importance principally in their role as intermediates. A partially condensed product formed by adding water to an alcoholethyl orthosilicate solution finds extensive use in the "lost wax" precision casting method.

Presently orthosilicates are produced by reacting the desired alcohol with silicon tetrachloride. Thus ethyl orthosilicate is produced on a large scale from the reaction of silicon tetrachloride with ethyl alcohol. In this process a large volume of corrosive hydrogen chloride is released, rendering the reaction unattractive. Further, this reaction suffers from the obvious economic disadvantage of requiring the use of silicon tetrachloride, only a minor portion of which is silicon.

It is accordingly among the objects of this invention to overcome the above and related difficulties encountered in prior art methods of obtaining orthosilicates.

A further object is to prepare alkyl and aryl orthasilicates from monohydroxy alcohols and calcium disilicide.

The reaction subject of the present invention can be summarized by the following equation:

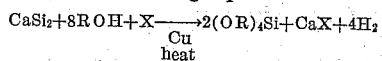

where X is a material capable of displacing silicon from calcium disilicide, and ROH is an aromatic or aliphatic monohydroxy alcohol.

For its success the instant invention depends, however, upon the preparation in situ of active silicon metal during the ester formation as a result of the metathetical step inherent in the above reaction, namely $$CaSi_2 + X \rightleftharpoons CaX + 2Si$$

Accordingly if the silicon is exposed to the atmosphere or is prepared prior to the introduction of the alcohol, this reaction will not proceed. For this reason technical grade silicon is inoperative.

Any material capable of liberating free or active silicon in alcoholic solution in the presence of a copper catalyst may be used. Most suitable among these are hydrogen chloride, chlorine and the copper halides. The latter are preferred, inasmuch as they react with calcium disilicide to give active silicon, and also deposit metallic copper, which catalyzes the reaction.

While this reaction may proceed without any catalyst, excellent results are obtained with copper catalysts.

In general, weight per cent of the copper catalyst based on the total weight of the reacting alcohol and disilicide should be between 1 percent and 5 percent. When stoichiometric cuprous chloride is used, the amount thereof should be between 9 percent and 32 percent on the same weight basis.

The instant reaction is very flexible insofar as pressure and temperature conditions are concerned, as long as a liquid phase is maintained. The reaction may be conducted at a temperature ranging from 110° C. to 260° C. under reflux conditions at atmospheric pressure, or in a bomb under autogenous pressure. Normally the reaction is continued until the evolution of hydrogen ceases. The product can be isolated by conventional fractional distillation techniques.

The following examples illustrate the successful practice of the invention.

Example I $$CaSi_2 + 8CH_3OH + 2CuCl \rightarrow 2(CH_3O)_4Si + CaCl_2 + 2Cu + 4H_2$$

A mixture of 10.5 grams of CaSi₂ and 20 grams of CuCl was placed in a flask fitted with a reflux condenser, and dried for one hour at 80° C. under vacuum. After cooling the mass and releasing the vacuum, 48 grams of methyl alcohol were placed in the flask, and the reactants heated slowly to 110° C. to 150° C. The evolution of hydrogen gas which soon began, stopped after a reaction time of seven hours. The reaction was then continued by adding 5.2 grams of calcium disilicide. After a total reaction time of 25 hours, the contents of the reaction flask were distilled under a vacuum. The yield of methyl orthosilicate was 48 percent based on the total weight of calcium disilicide charge.

Example II

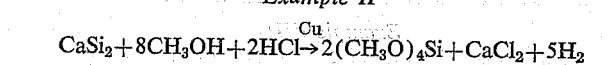

0.9 gram of CaSi₂, 0.042 gram copper powder, 0.4672 gram HCl and 1.6384 grams of CH₃OH were heated in a bomb at 235° C. for 1½ hours. After pumping off the hydrogen, the fluid components were placed in a vacuum fractionation apparatus and 0.9205 gram of methyl orthosilicates was obtained, equivalent to a yield of 47.3 weight percent based on the methyl alcohol.

Example III

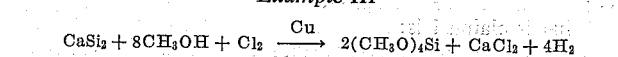

In this experiment 1.0456 grams of calcium disilicide, 0.048 gram of copper powder, 0.505 gram of Cl₂ and 1.824 grams CH₃OH were heated in a bomb at 230° C. for 1½ hours. The hydrogen evolved was pumped away, and the fluid products were separated by fractional condensation in vacuum. The overall yield of methyl orthosilicate was 63 weight percent based on charged CH₃OH.

Example IV $$CaSi_2 + 8C_4H_9OH + 2CuCl \rightarrow 2(C_4H_9O)_4Si + CaCl_2 + 2Cu + 4H_2$$

In this experiment the reactants consisted of 10 grams of calcium disilicide, 15.8 grams of CuCl and 70 grams of anhydrous n-butanol. The previously dried CaSi₂/CuCl mixture and the butanol were placed in a flask fitted with a reflux condenser. The flask was heated to 100° C. to 130° C. for about ½ hour. After this time evolution of gas almost ceased. The temperature was raised to 200° C. and maintained there for two hours until no more gas evolved. During this time the original color of the CaSi₂/CuCl mixture changed from grey to redbrown, and copper particles were detected, owing to the reaction CaSi₂+2CuCl→CaCl₂+2Si+2Cu. The reaction products were cooled to 100° C. and distilled under vacuum to give tetra-butyl orthosilicate. The yield of the butyl ester amounted to 12.7 weight percent based on the contained silicon in the charged calcium disilicide.

Example V $$CaSi_2 + 8C_6H_5OH + 2CuCl \rightarrow 2(C_6H_5O)_4Si + CaCl_2 + 2Cu + 4H_2$$

A mixture consisting of 15.7 grams of $CaSi_2$, 24 grams of CuCl and 115 grams of $C_6H_5OH$ was refluxed at 200° C. The temperature was next raised to 260° C. and maintained there for seven hours. The effluent products were distilled at 300° C. in vacuum from the solid residue. The distillate was then fractionally distilled under vacuum to give 70.2 weight percent of phenyl orthosilicate based on the charged silicon in the calcium disilicide.

*Example VI*

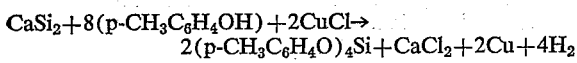

A mixture consisting of 10 grams of $CaSi_2$, 16 grams of CuCl and 100 grams of p-cresol were refluxed at 170° C. to 200° C. for five hours. The temperature was then increased to 240° C. and maintained at that point for one hour. The reaction products were distilled at 300° C. in vacuum to give p-cresyl orthosilicate. The yield was 54.2 weight percent based on the silicon contained in the charged $CaSi_2$.

*Example VII*

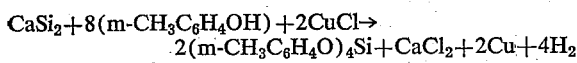

A mixture consisting of 10 grams of $CaSi_2$, 18.9 grams CuCl and 100 grams m-cresol was refluxed for 7½ hours at 150° C. to 200° C. A fractional distillation of the distillable products gave 64.6 weight percent of m-cresyl orthosilicate based on charged silicon values.

*Example VIII*

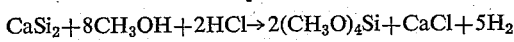

A bomb high pressure reaction was performed to form $Si(OCH_3)_4$ without any copper catalyst. In this preparation 9 parts of $CaSi_2$, about 4.67 parts by weight of HCl and 16.38 parts by weight of $CH_3OH$ were heated in a bomb at 239° C. for 1½ hours. After this time the hydrogen was pumped off. The fluid components were fractionated to yield 39.3 weight percent of $Si(OCH_3)_4$ (based on $CH_3OH$ charged).

What is claimed is:

1. A process for preparing orthosilicic acid esters, which comprises heating a liquid mixture consisting of calcium disilicide, a monohydroxy alcohol, at least one copper catalyst, and at least one chlorine-containing metathetical reactant selected from the group which consists of chlorine and hydrogen chloride, and separating the resulting ester from the reaction mass.

2. A process for preparing orthosilicic acid esters, which comprises heating a liquid mixture consisting of calcium disilicide, a monohydroxy alcohol, and a copper halide, and separating the resulting ester from the reaction mass.

3. A process for preparing orthosilicic acid esters, which comprises heating under autogenous pressure, a liquid mixture consisting of calcium disilicide, a monohydroxy alcohol, at least one copper catalyst, and at least one chlorine-containing metathetical reactant selected from the group which consists of chlorine and hydrogen chloride, and separating the resulting ester from the reaction mass.

4. A process for preparing orthosilicic acid esters, which comprises heating under autogenous pressure, a liquid mixture consisting of calcium disilicide, a monohydroxy alcohol, and a copper halide, and separating the resulting ester from the reaction mass.

5. A process for preparing orthosilicic acid esters, which comprises heating a liquid mixture consisting of calcium disilicide and monohydroxy alcohol, and between 9 percent and 32 percent by weight of cuprous chloride, and separating the resulting ester from the reaction mass.

6. A process for preparing orthosilicic acid esters, which comprises heating under autogenous pressure, a liquid mixture consisting of calcium disilicide and monohydroxy alcohol, and between 9 percent and 32 percent by weight of cuprous chloride, and separating the resulting ester from the reaction mass.

7. A process for preparing methyl orthosilicate, which comprises refluxing a mixture consisting of 10.5 parts by weight of calcium disilicide, 20 parts of cuprous chloride and 48 parts of methyl alcohol, and separating methyl orthosilicate from the reaction mass.

8. A process for preparing methyl orthosilicate, which comprises heating to about 235° C. in a bomb, a mixture consisting of 0.9 part by weight of calcium disilicide, 0.04 part by weight of copper, about 0.46 part by weight of hydrogen chloride and about 1.6 parts by weight of methyl alcohol, and separating the formed methyl orthosilicate from the reaction mass.

9. A process for preparing tetra-butyl ortho-silicate, which process comprises refluxing a mixture consisting of 10 parts by weight of calcium disilicide, 15.8 parts by weight of cuprous chloride, 70 parts of anhydrous butanol, and separating tetra-butyl orthosilicate from reaction mass.

10. A method of preparing phenyl orthosilicate, which method comprises refluxing at a temperature of 200° C. to 260° C., a mixture consisting of about 15.7 parts by weight of calcium disilicide, 24 parts of cuprous chloride and 115 parts of phenol, and separating phenyl orthosilicate from the reaction mass.

11. A method of preparing p-cresyl orthosilicate, which method comprises refluxing at a temperature between 170° C. and 240° C., a mixture consisting of 10 parts by weight of calcium disilicide, 16 parts of cuprous chloride and 100 parts of p-cresol, and separating p-cresyl orthosilicate from the reaction mass.

12. A method of preparing m-cresyl orthosilicate, which method comprises refluxing at a temperature between 150° C. to 200° C., a mixture consisting of 10 parts by weight of calcium disilicide, about 18.9 parts by weight of cuprous chloride and about 100 patrs by weight of m-cresol and separating the product from the reaction mass.

13. A method of preparing methyl orthosilicate which method comprises heating in a bomb at about 230° C. a mixture of methyl alcohol, hydrogen chloride and calcium disilicide and separating methyl orthosilicate from the reaction mass.

References Cited in the file of this patent

UNITED STATES PATENTS 2,445,576    Haber                July 20, 1948
2,473,260    Rochow             June 14, 1949

OTHER REFERENCES

Wohler et al.: "Zietschrift für Anorganische und Allgemeine Chemie," vol. 120 (1922), pages 49–70 (page 67 only needed).

Kautsky et al.: "Chemische Berichte," vol. 86 (1953), pages 1226–1234.